(12) United States Patent
Raasch

(10) Patent No.: US 8,845,486 B2
(45) Date of Patent: Sep. 30, 2014

(54) TRANSMISSION FOR OUTDOOR POWER EQUIPMENT

(75) Inventor: Jason J. Raasch, Cedarburg, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 370 days.

(21) Appl. No.: 13/153,147

(22) Filed: Jun. 3, 2011

(65) Prior Publication Data

US 2011/0232928 A1 Sep. 29, 2011

Related U.S. Application Data

(63) Continuation-in-part of application No. 12/404,808, filed on Mar. 16, 2009, now Pat. No. 8,267,835.

(60) Provisional application No. 61/037,388, filed on Mar. 18, 2008.

(51) Int. Cl.
F16H 61/662 (2006.01)

(52) U.S. Cl.
USPC ............................. 477/44; 477/115; 474/17

(58) Field of Classification Search
USPC ..................................... 477/42, 44
See application file for complete search history.

(56) References Cited

U.S. PATENT DOCUMENTS

| | | | |
|---|---|---|---|
| 2,678,566 A | 5/1954 | Oehrli | |
| 4,173,155 A * | 11/1979 | Togami et al. | 474/19 |
| 4,278,928 A | 7/1981 | Griffiths et al. | |
| 4,539,000 A | 9/1985 | Gayer | |
| 4,649,486 A | 3/1987 | Oshiage | |
| 4,651,082 A | 3/1987 | Kaneyuki | |
| 4,699,025 A | 10/1987 | Omitsu | |
| 4,700,590 A | 10/1987 | Omitsu | |
| 4,733,155 A | 3/1988 | Smith | |
| 4,790,799 A | 12/1988 | Sadler | |
| 4,824,419 A | 4/1989 | Kumm | |
| 4,897,942 A * | 2/1990 | Klas et al. | 474/12 |
| 4,925,432 A | 5/1990 | Miyamaru et al. | |
| 4,969,857 A | 11/1990 | Kumm | |
| 4,991,400 A * | 2/1991 | Wilkinson | 62/228.4 |
| 5,539,258 A * | 7/1996 | Sutton et al. | 290/40 R |
| 6,017,285 A | 1/2000 | Yasuhara et al. | |
| 6,095,937 A * | 8/2000 | Aaen | 474/10 |
| 6,099,424 A | 8/2000 | Tsai et al. | |

(Continued)

FOREIGN PATENT DOCUMENTS

JP 04-120308 4/1992
JP 05-162544 6/1993

OTHER PUBLICATIONS

"Signature Pro Commercial Duty Dual-Stage," http://www.simplicitymfg.com/products/snow-throwers/signature-pro-professional-duty-dual-stage/, accessed Sep. 18, 2012, 1 page.

(Continued)

*Primary Examiner* — Jacob S Scott
(74) *Attorney, Agent, or Firm* — Foley & Lardner LLP

(57) ABSTRACT

Outdoor power equipment includes an engine having a throttle and a drive shaft, a driven shaft, a tool coupled to the driven shaft. The engine further includes a transmission coupling the drive and driven shafts and providing a mechanical advantage therebetween. The transmission automatically changes the mechanical advantage in response to torque experienced by the driven shaft.

14 Claims, 5 Drawing Sheets

(56) References Cited

U.S. PATENT DOCUMENTS

| | | | |
|---|---|---|---|
| 6,129,643 A | 10/2000 | Tamagawa et al. | |
| 6,179,739 B1 * | 1/2001 | Tsai et al. | 474/12 |
| 6,290,620 B1 | 9/2001 | Tsai et al. | |
| 6,618,275 B2 | 9/2003 | Suzuki et al. | |
| 6,637,283 B2 | 10/2003 | Belloso | |
| 6,672,981 B2 | 1/2004 | Inoue et al. | |
| 6,941,918 B2 * | 9/2005 | Laimboeck | 123/195 R |
| 6,983,736 B2 * | 1/2006 | Mitchell et al. | 123/376 |
| 7,850,555 B2 * | 12/2010 | Keane et al. | 474/19 |
| 8,052,556 B2 * | 11/2011 | Hartley | 474/46 |
| 8,393,985 B2 * | 3/2013 | Blanchard | 474/37 |
| 2004/0040533 A1 | 3/2004 | Laimboeck | |
| 2005/0153805 A1 | 7/2005 | Koyama | |
| 2005/0233846 A1 | 10/2005 | Green et al. | |
| 2006/0245934 A1 | 11/2006 | Deivasigamani | |
| 2008/0047753 A1 | 2/2008 | Hall et al. | |
| 2009/0159392 A1 | 6/2009 | Vaughn et al. | |
| 2010/0154373 A1 | 6/2010 | Newell | |
| 2010/0319223 A1 | 12/2010 | Wians et al. | |
| 2011/0000175 A1 | 1/2011 | Lahey et al. | |

OTHER PUBLICATIONS

Briggs & Stratton Corporation, "Signature Pro Dual Stage Snowthrowers," 2011, 32 pages.

Gates Corporation, How Does the Clutch System Work? www.gates.com/brochure.cfm?brochure=1033&location_id=542, Mar. 6, 2008, 7 pages.

Longhurst, The Transmission Bible, www.carbibles.com/transmission_bible.html, Feb. 14, 2008, 46 pages.

Memmer, CVT Enters the Mainstream, www.edmunds.com/ownership/techcenter/articles/45104/article.html, Mar. 3, 2008, 3 pages.

* cited by examiner

TRANSMISSION FOR OUTDOOR POWER EQUIPMENT

CROSS-REFERENCE TO RELATED PATENT APPLICATIONS

This is a continuation-in-part of U.S. application Ser. No. 12/404,808, filed Mar. 16, 2009, which claims the benefit of U.S. Provisional Application No. 60/037,388, filed Mar. 18, 2008, both of which are incorporated herein by reference in their entireties.

BACKGROUND

The present invention relates to outdoor power equipment, such as snow throwers, tractors, rotary tillers, portable generators, and lawn mowers. More specifically, the present invention relates to a transmission for outdoor power equipment.

Physical loading of outdoor power equipment typically depends upon the task being performed by the tool of the outdoor power equipment. For example, the loading on a lawn mower engaging a patch of long, thick grass varies widely from the loading corresponding to spinning the blade over a sidewalk or driveway. The loading on a snow thrower varies depending upon the density, temperature, and volume of snow being removed.

Typically engines of outdoor power equipment include a governor coupled to a power takeoff of an engine that drives the powered tool. As loading increases, increased resistance in the power takeoff slows the rotation of the power takeoff, which is sensed by the governor. In turn, the governor operates the throttle to increase the power output of the engine to compensate for the change in loading. A transmission may be used to provide a mechanical advantage between the engine and powered tool to adjust torque and rotational speed provided by the power takeoff of the engine to the powered tool.

SUMMARY

One embodiment of the invention relates to outdoor power equipment, which includes an engine having a throttle and a drive shaft, a driven shaft, a tool coupled to the driven shaft. The engine further includes a transmission coupling the drive and driven shafts and providing a mechanical advantage therebetween. The transmission automatically changes the mechanical advantage in response to torque experienced by the driven shaft.

Another embodiment of the invention relates to outdoor power equipment, which includes an engine having a throttle and a drive shaft, a driven shaft, and a tool coupled to the driven shaft. The engine further includes a transmission and a governor. The transmission couples the drive and driven shafts and provides a mechanical advantage therebetween. The governor operates the throttle of the engine as a function of rotational speed of the driven shaft.

Yet another embodiment of the invention relates to an engine, which includes an engine block, a piston, a crankshaft, an output shaft, and a transmission. The piston is configured to translate in the engine block in response to combustion processes of the engine. The crankshaft is supported by the engine block and coupled to the piston. The output shaft is supported by the engine block and coupled to the crankshaft. The transmission couples the crankshaft and the output shaft of the engine, providing a mechanical advantage therebetween.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
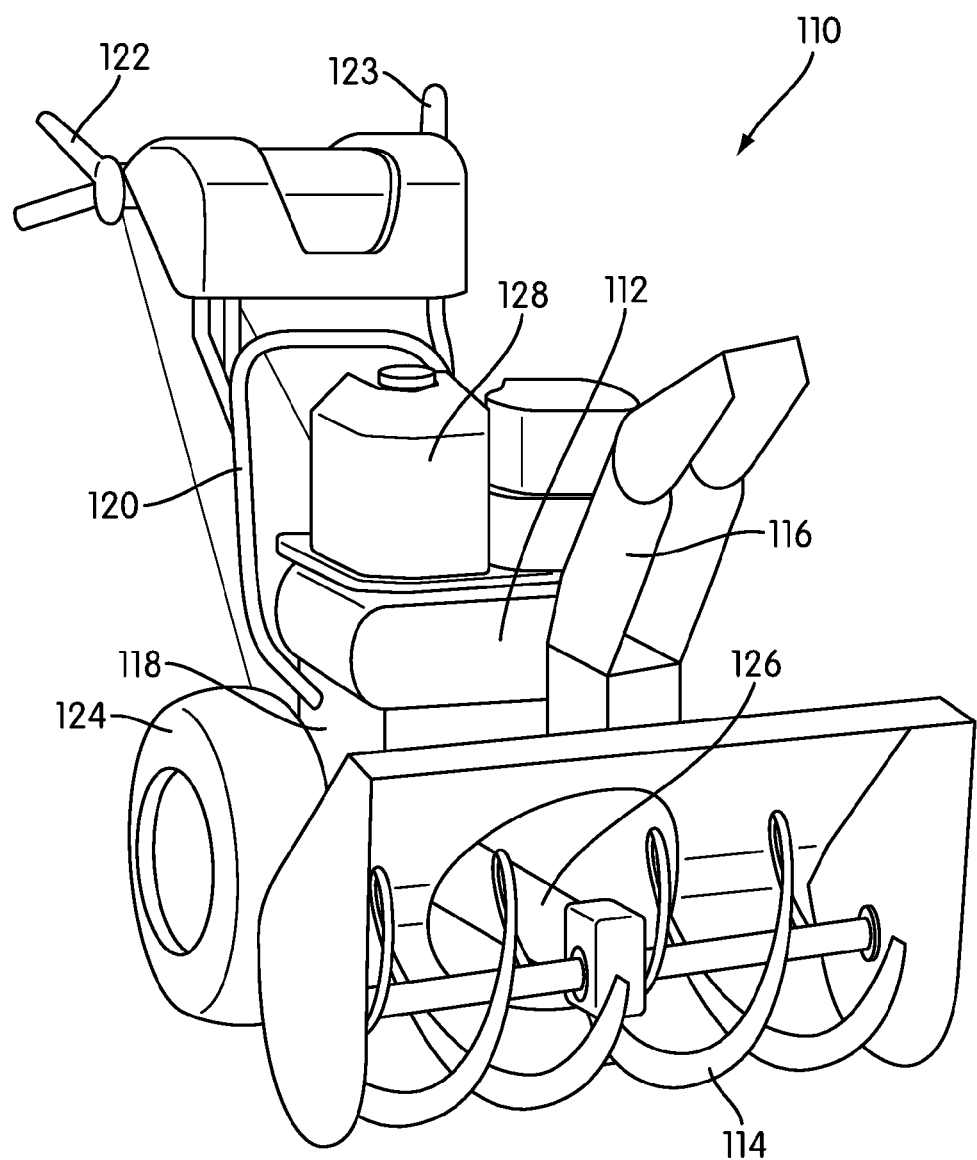
FIG. 1 is a perspective view of a snow thrower according to an exemplary embodiment of the invention.

Referring to FIG. 1, outdoor power equipment in the form of a snow thrower 110 includes an engine 112 configured to drive a powered tool in the form of an auger 114. The auger 114 is designed to transfer snow through a chute 116 to clear a snow-covered surface, such as a sidewalk or driveway. The engine 112 is supported by a frame 118 (e.g., support structure) of the snow thrower 110, which also includes a handle 120 and controls 122, 123, such as a clutch lever or a throttle lever. According to an exemplary embodiment, the engine 112 is coupled to a fuel tank 128, which delivers liquid fuel to the engine 112 as needed.

According to an exemplary embodiment, wheels 124 extend from axles supported by the frame 118, and a drivetrain may be coupled to the engine 112 to power the wheels 124. A powertrain 126 for the auger 114 also extends from the engine 112. In other embodiments, the engine is coupled only to a powertrain of a powered tool. In still other embodiments, the engine is coupled only to a drivetrain. In contemplated embodiments, the engine drives multiple tools and/or a drivetrain. In each case, a transmission may be used to transfer rotation from the engine to the tool or wheels, and in each case a governor or other sensor may be coupled to a driven shaft that is associated with the tool or wheels to provide feedback to operate a throttle of the engine. In some embodiments, the shaft associated with the tool may be integrated with the engine, but separate from a crankshaft of the engine.

According to an exemplary embodiment, the snow thrower 110 is configured to operate the auger 114 at a substantially constant rotational rate (e.g., velocity, speed), regardless of torque experienced by the auger 114. A control system of the snow thrower 110 automatically functions to maintain the rotational rate that has been set. If torque experienced by the auger 114 increases, the snow thrower 110 includes a feedback loop designed to have the engine 112 deliver more power to compensate for the increased torque so that the auger 114 maintains the desired constant rotational rate, and vice versa for decreases in torque (see generally FIG. 6).

While FIG. 1 shows the snow thrower 110, other forms of outdoor power equipment may benefit from innovations disclosed herein. Some such power equipment includes lawn mowers, rotary tillers, chippers, log splitters, portable generators, secondary-power generators, tractors, pressure washers, compressors, and other types of power equipment that may include a combustion engine used in conjunction with a transmission to drive a powered tool or drivetrain.

Figure 2:
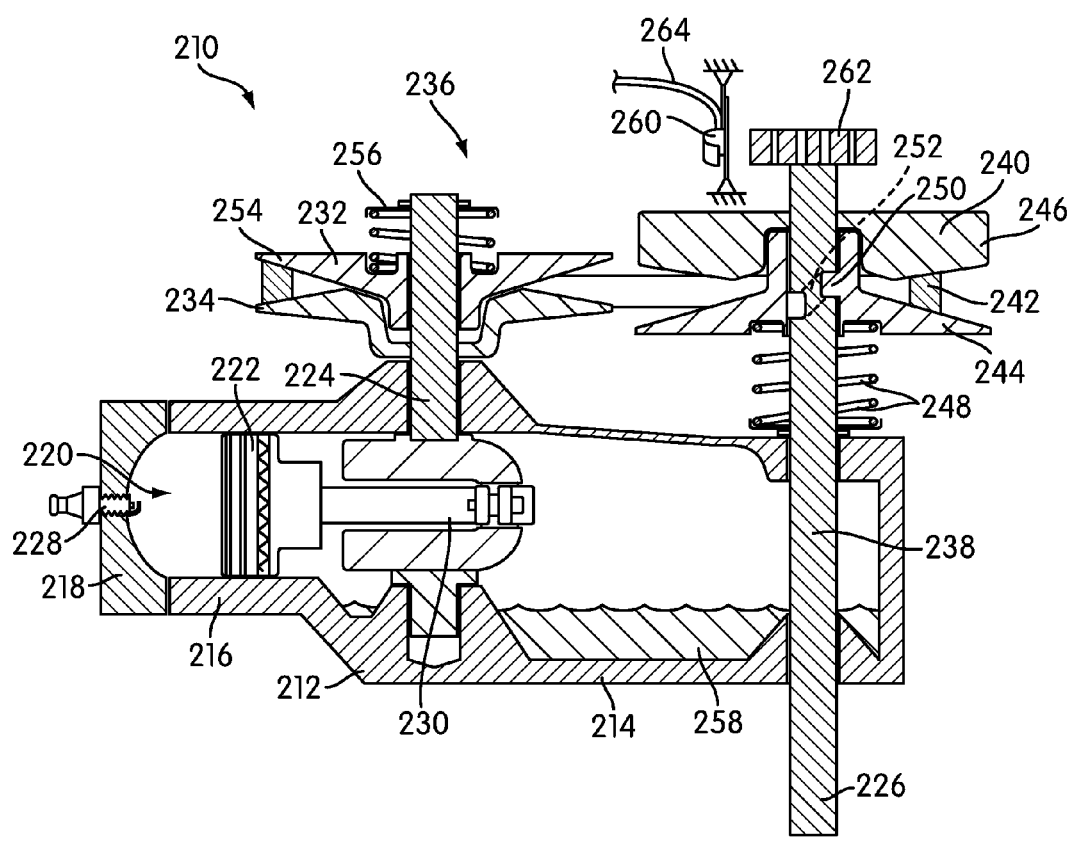
FIG. 2 is a sectional view of an engine according to an exemplary embodiment of the invention.

Referring to FIG. 2, an engine 210 may be used to drive a powered tool or drivetrain of outdoor power equipment (see, e.g., snow thrower 110 as shown in FIG. 1). The engine 210 includes an engine block 212, which includes a crankcase 214, a cylinder 216, and a cylinder head 218. A combustion chamber 220 is formed near the end of the cylinder 216, between the cylinder head 218 and a piston 222. The engine 210 further includes a crankshaft 224 and a power takeoff 226. The powered tool or drivetrain may be coupled directly or indirectly to the power takeoff 226. In some embodiments, the engine may be horizontal or vertically shafted, may be diesel-powered, gasoline-powered, ethanol-powered, etc., and may be a single or multi-cylinder engine having a two- or four-stroke cycle.

During operation of the engine 210, a spark plug 228 ignites fuel in the combustion chamber 220, which drives the piston 222 down (to the right in FIG. 2) to bottom-dead-center position. A connecting rod 230 couples the piston 222 to the crankshaft 224 and the downward force of the piston 222 rotates the crankshaft 224. Rotational momentum of the output shaft 238 may be captured in mass of the output shaft 238 and in a flywheel (e.g., half 246 of second wheel 240, where one wheel 240 may have greater rotational momentum than the other wheel 232, such as at least twice). Following the downward stroke of the piston 222, rotation of the crankshaft 224 pushes the piston 222 to top-dead-center position (to the right in FIG. 2).

Still referring to FIG. 2, the engine 210 further includes a transmission 236 (e.g., gearbox, torque converter, belt transmission) integrated with the engine 210 and an output shaft 238 that is separate from the crankshaft 224. In such embodiments, the crankshaft 224 of the engine serves as a drive shaft, and the output shaft 238 is a driven shaft. The drive shaft drives the driven shaft by way of the transmission 236, which scales the torque and rotational rate communicated between the drive and driven shafts. In contemplated embodiments, a driven shaft is simply the hub of a wheel (e.g., first or second wheels 232, 240). In other exemplary embodiments, the driven shaft is an elongate, cylindrical body such as the output shaft 238 of the engine 210.

Various forms of transmissions are contemplated for use with engines and outdoor power equipment as disclosed herein. In some embodiments, the transmission 236 is a continuously variable transmission that allows for infinite values of mechanical advantage, within a bounded range, between the driving and driven components, where the different values of mechanical advantage may be referred to as different "gears" of the transmission, gear ratios, drive ratios, distributions of torque and speed, etc. In other embodiments, the transmission is a direct transmission with discrete settings corresponding to different values of mechanical advantage.

According to an exemplary embodiment, the transmission 236 of the engine 210 includes a first wheel 232 and a second wheel 240 that is coupled to the first wheel 232. In some embodiments the first and second wheels 232, 240 are wheels of a pulley system (e.g., pulleys, sheaves). In other embodiments, the wheels are gears, portions of cones, or other rotating elements. In contemplated embodiments, the first and second wheels may directly contact one another to transfer rotation and torque, or may be coupled by an intermediate element, such as a belt 242 (e.g., a chain, composite loop, metal loop), additional wheels, etc.

Still referring to FIG. 2, the first and second wheels 232, 240 are sheaves of a pulley system. In some embodiments, the second wheel 240 has an adjustable working diameter (e.g., twice the radius of the lever-arm, or twice the distance between the belt and axis of rotation). According to an exemplary embodiment, halves 244, 246 (e.g., faces, plates) of the second wheel 240 include inclined annular surfaces that face each other and move relative to one another, changing the working diameter about which the belt 242 is supported.

In some embodiments, the halves 244, 246 of the second wheel 240 are moved relative to one another by an automated process. A first of the halves 246 is fixed to the output shaft 238 and the transmission includes a spring 248 that biases the second half 244 toward the first half 246. However, the second half 244 is able to move a bounded lengthwise distance relative to the output shaft 238.

According to an exemplary embodiment, the second half 244 of the second wheel 240 includes a roller 250 that is configured to move in a diagonal track 252. Increased torque in the output shaft 238 is experienced by the second half 244 of the second wheel 240, which may then overcome the bias of the spring 248, causing rotation in the track 252 and lengthwise movement of the second half 244 relative to the first half 246. Such movement may decrease the working diameter of the second wheel 240, while the opposite movement, corresponding to a decrease in torque in the output shaft 238, increases the working diameter.

As the working diameter of the second wheel 240 changes in response to changes in torque in the output shaft 238, tension in the belt 242 changes. In some embodiments, the first wheel 232 includes a moving half 254 (or halves) biased with a spring 256 to maintain a predetermined tension in the belt 242. As the working diameter of the second wheel 240 changes, the working diameter of the first wheel 232 oppositely changes to compensate for the change in working diameter of second wheel 240 and to maintain sufficient tension for fraction in the belt 242.

FIG. 2 shows the fixed halves 246, 234 of the first and second wheels 232, 240 on opposite sides of the respective wheels 232, 240. In other embodiments, the fixed halves 246, 234 may both be on the same sides of the respective wheels, either both on the side closer to the crankcase or both on the opposite side. In still other embodiments, both halves 234, 254 and 244, 246 of both wheels 232, 240 move to change the working diameter of the respective wheels 232, 240.

In some embodiments, a tensioning wheel (not shown) may be used to maintain tension in the belt 242 despite changes in the working diameter of the second wheel 240. In some such embodiments, the working diameter of the first wheel is fixed. The tensioning wheel may be biased by a spring to maintain a predetermined tension in the belt 242. Additional disclosure of a transmission including such pulley systems is provided in U.S. application Ser. No. 12/404,808.

In contemplated embodiments, the belt 242 may slide on wheels in the form of sections of cones, where the width of the cone about which the belt is operating determines the working diameter of the wheel. In still other embodiments, circuitry (e.g., electronic control unit, engine control unit, control computer) determines a target working diameter of the second wheel 240 and moves one or both of the halves 244, 246 of the second wheel 240 with an actuator, such as a solenoid or hydraulic cylinder. In some embodiments, such circuitry and actuators may be used to operate transmissions having discrete gear ratios.

Still referring to FIG. 2, the drive shaft, in the form of the crankshaft 224, and driven shaft, in the form of the output shaft 238, are both integrated with the engine block 212 of the engine 210. In some embodiments, portions of both the drive and driven shafts extend through the crankcase 214 of the engine block 212, and share a common reservoir of lubricant 258 (e.g., motor oil). In some such embodiments, the power takeoff 226 of the engine 210 is on an end of the driven shaft.

In contemplated embodiments, the engine block includes an exterior support for the driven shaft, such as bushings mounted to the exterior of the engine block. In such embodiments, only the drive shaft extends through the crankcase 214. In still other embodiments the driven shaft is separated from the engine block, and may be independently supported by a frame of outdoor power equipment or by an extension therefrom (e.g., housing, axle).

In some configurations, where a torque-sensitive variable-diameter wheel of a transmission is attached to the crankshaft, the transmission may be used to transfer a constant load and speed output of the engine to the tool, by varying the speed of the tool as a function of torque experienced by the tool. However in some applications, performance of the tool may be improved by a constant or substantially constant speed of the tool (having momentary variations in the speed occurring in dynamic response to changes in torque on the tool, throttle setting of the equipment, or other variables). With the snow thrower 110 (FIG. 1), a constant speed of the auger may allow for consistent throwing of the snow. With a portable generator, a constant rotor speed may allow for consistent output current, as discussed in U.S. application Ser. No. 12/404,808. Other outdoor power equipment applications may also benefit from a substantially constant speed of the powered tool.

Accordingly, in some preferred configurations, a torque-sensitive variable-diameter wheel is attached to the driven shaft, such as the output shaft 238. In such embodiments, the transmission will provide torque to the tool as a function of torque experienced by the tool. In some such embodiments, a rotational-speed-sensitive governor, operating the throttle of the engine, is attached to the driven shaft so that the velocity of the driven shaft provides feedback to the engine. In such configurations, the velocity of the driven shaft may be maintained, despite changes in torque experienced by the tool, by adjusting both the speed (via the throttle) and the torque (via the transmission) provided by the engine.

Figure 3:
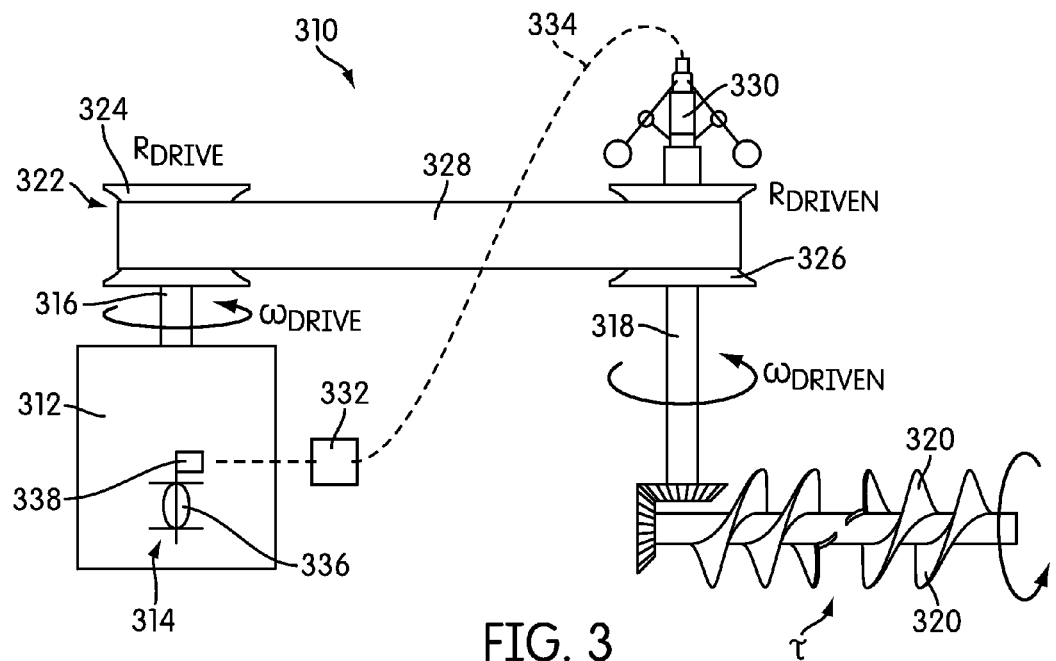
FIG. 3 is a schematic view of a snow thrower according to an exemplary embodiment of the invention.

According to an exemplary embodiment, the engine includes a pneumatic governor 260 coupled to the output shaft 238. The governor 260 includes a mechanism sensitive to the rotational rate of the output shaft 238 in the form of an air vane that is driven by a blower fan 262 mounted to the output shaft 238. The air vane of the pneumatic governor 260 is blown to an orientation that is a function of the rate of rotation of the output shaft 238. In other embodiments the mechanism may be in the form of an accelerometer, biased flyweights acting upon a lever (see, e.g., governor 330 as shown in FIG. 3), an optical sensor configured to provide an electric signal upon rotating past an optical trigger, or other sensors. The governor 260 may serve as the primary or only speed governor of the engine 210.

According to an exemplary embodiment, the governor 260 further includes a linkage 264 (e.g., communication line, cable) that communicates a signal associated with the rate of rotation of the output shaft to a throttle system of the engine 210. The signal may be in the form of movement of an inner wire of a Bowden cable, an electric pulse, hydraulic flow or pressure, or in other forms. The signal may directly actuate the throttle plate of the throttle system (see, e.g., throttle plate 336 as shown in FIG. 3), such as by applying a force to a lever integrated with the throttle plate; may bias a governor spring; or may otherwise operate the throttle system to control the engine 210 output as a function of the rate of rotation of the output shaft 238, as opposed to the crankshaft 224. Controlling the engine as a function of the rate of rotation of the output shaft 238 allows for the engine to drive the output shaft 238 at a substantially constant velocity.

In contemplated embodiments, the linkage 264 of the governor 260 is not coupled directly to the throttle system of the engine 210, but instead to an intermediate system (see, e.g., system 332 as shown in FIG. 3) configured to manipulate the signal of the governor 260. In some embodiments, the signal is electronic, and the intermediate system includes circuitry configured to amplify, scale down, offset, time-delay, filter (e.g., low-cut filter in which torque must be above a minimum threshold for the circuitry to change the throttle setting), or otherwise manipulate the signal. In other embodiments, the signal is hydraulic, and the intermediate system includes a variable restrictor configured to dampen noise in the signal. In still other embodiments, mechanical or pneumatic equivalents may be used to manipulate the signal between the governor 260 and the throttle system.

A similar intermediate system, such as a rotational damper, friction surfaces, ratcheting surfaces, etc., coupled to both the output shaft and the second wheel, may be used to control adjustment of the working diameter of the second wheel (or other transmission system), to eliminate response to noise, unstable response behavior (e.g., increasing oscillatory response), or otherwise control the response of the transmission system to changes in torque experienced by the output shaft.

In contemplated embodiments, halves of one or both of the wheels may be weighted to serve as flywheels for the engine. As such, in some embodiments the crankshaft may include no additional flywheel. In contemplated embodiments, both the crankshaft and the output shaft include blower fans configured to cool the engine.

In contemplated embodiments an electric motor may be used in conjunction with a continuously variable transmission to drive a powered tool, where torque experienced by the powered tool adjusts the mechanical advantage provided by the transmission. Such a system may further include a sensor configured to operate the electric motor based on the speed of the powered tool. In some embodiments, the associated system need not be for outdoor use.

Figure 4:
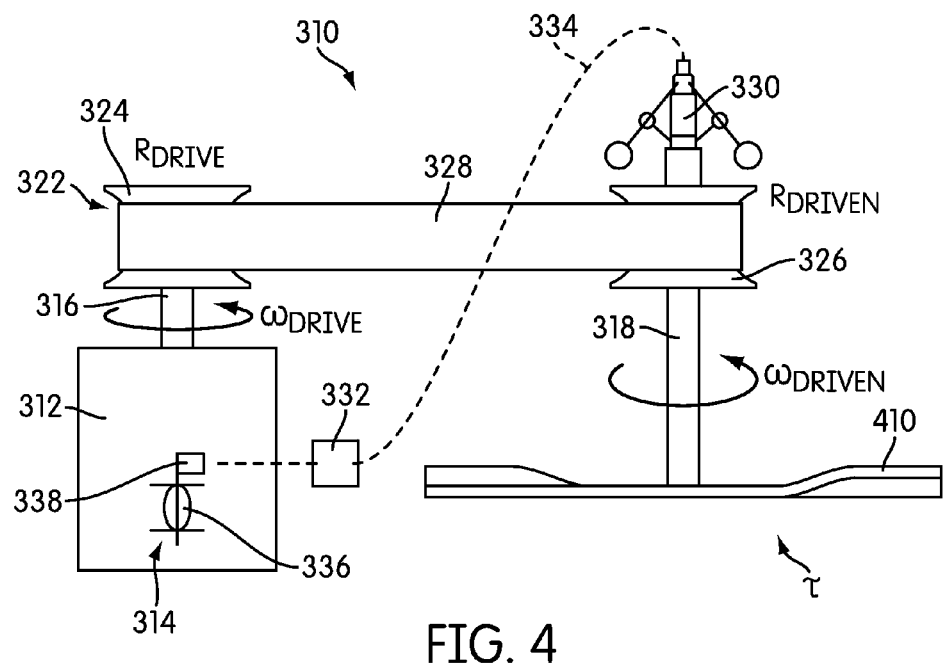
FIG. 4 is a schematic view of a lawn mower according to an exemplary embodiment of the invention.
Figure 5:
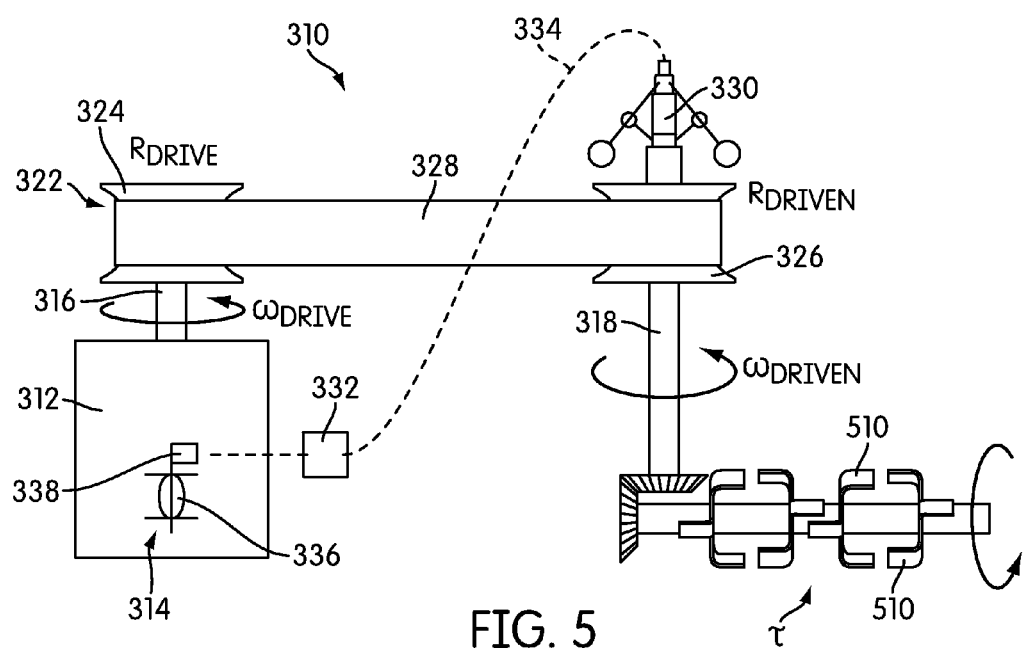
FIG. 5 is a schematic view of a rotary tiller according to an exemplary embodiment of the invention.

Referring now to FIGS. 3-5, outdoor power equipment 310 includes an engine 312 having a throttle system 314 and a drive shaft 316. The outdoor power equipment 310 further includes a driven shaft 318 and a tool coupled to the driven shaft 318. In FIG. 3, the tool is an auger 320 of a snow thrower. In FIG. 4, the tool is a lawn mower blade 410 of a walk-behind lawn mower or riding lawn mower. In other embodiments the blade may be a rotary saw blade. In FIG. 5, the tool includes tines 510 of a rotary tiller. In other contemplated embodiments, the driven shaft 318 may be coupled to a drivetrain, a rotor of a generator, a drill, a spreader, or other tools.

According to an exemplary embodiment, the drive shaft 316 is coupled to the driven shaft 318 by a transmission 322, which includes a first wheel 324 attached to the drive shaft 316, a second wheel 326 attached to the driven shaft 318, and a belt 328 extending therebetween. In some embodiments, the wheels 322, 326 are sheaves of a pulley system. The working diameter of the second wheel 326 is configured to change in response to torque experienced by the driven shaft 318 such that the mechanical advantage provided by the transmission 322 is controlled as a function of torque on the tool (which is related to torque in the driven shaft 318).

The working diameter of the first wheel 324 is configured to change in response to tension in the belt 328. In other contemplated embodiments, the torque-responsive wheel may be on the opposite shaft such that torque in the drive shaft changes the mechanical advantage of the transmission.

Still referring to FIGS. 3-5, the outdoor power equipment 310 further includes a governor 330 coupled to the driven shaft 318. In some embodiments, the governor 330 is mounted directly to the driven shaft 318. In other embodiments, the governor is mounted to a shaft, wheel, or other body rotated by the driven shaft. In still other embodiments, the governor is a stationary sensor that monitors rotations of the driven shaft, such as by sensing passing of a magnet integrated in the driven shaft, a protrusion projecting from the driven shaft, a reflection from a mirror or light emitted from a diode integrated with the driven shaft, or by other such means.

According to an exemplary embodiment, the governor 330 is coupled to a throttle system 314 of the engine 312 such that the engine 312 is operated in response to the rotational speed of the driven shaft 318. An intermediate system 332 may scale or otherwise manipulate the signal provided by the governor 330, such as in response to adjustment of a target for the rotational speed of the driven shaft 318 or to condition the responsiveness of the engine 312 to sensed changes in torque or speed experienced by the driven shaft 318. In some embodiments, the governor 330 provides a mechanical signal via a link 334 that directly operates the throttle plate 336 by actuating a lever 338 fixed to the throttle plate 336. In other embodiments, the governor 330 applies a force to the throttle system 314 that augments force provided by a governor spring, throttle lever, manual lever, throttle linkage, and/or other features of the throttle system.

Figure 6:
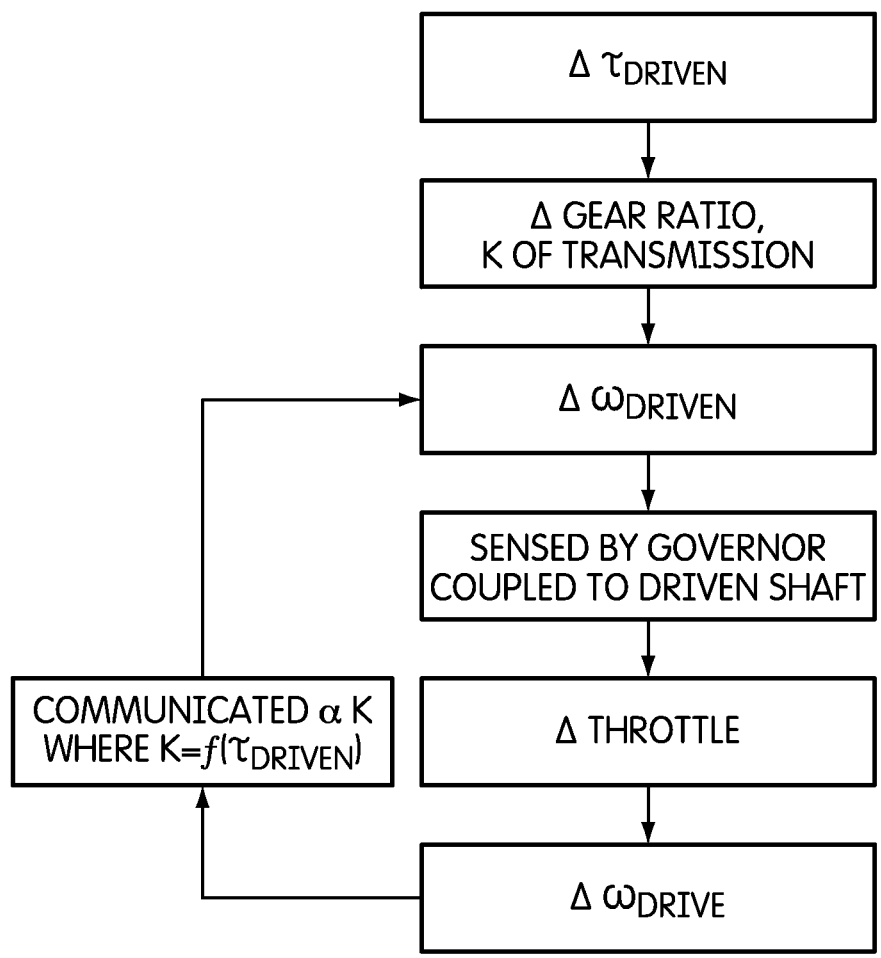
FIG. 6 is a flowchart of operating processes of outdoor power equipment according to an exemplary embodiment of the invention.

Referring now to FIG. 6, a flowchart 410 includes events that may occur during operation of outdoor power equipment, such as the outdoor power equipment 310 shown in FIGS. 3-5. According to an exemplary embodiment, a change in torque is experienced by a powered tool. The change in torque is communicated to the driven shaft coupled to the powered tool. In response to the change in torque, the mechanical advantage of the transmission is adjusted, which impacts the speed of the driven shaft. The change in speed of the driven shaft is sensed by the governor and relayed to the throttle of the engine. The throttle of the engine adjusts the output of the engine, as necessary. Increased or decreased rotational speed or torque of the engine is delivered by the drive shaft of the engine, at a gear ratio that is a function of the torque in the driven shaft, through transmission to the driven shaft, returning the powered tool to the target rotation rate.

In contemplated embodiments, some or all of the transmission may be coupled to the engine by way of a modular gear housing designed to universally adapt to various power take-off and engine configurations. Such a housing may include a governor speed pick-up coupled to the respective driven shaft and a feedback loop to the engine throttle.

The construction and arrangements of the outdoor power equipment, engines, and transmissions, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. Outdoor power equipment, comprising:
   an engine comprising a throttle, an engine block, and a drive shaft;
   a driven shaft, wherein the driven shaft at least partially extends through the engine block and wherein the drive and driven shafts share a reservoir of lubricant;
   a tool coupled to the driven shaft; and
   a transmission coupling the drive and driven shafts and providing a mechanical advantage therebetween, wherein the transmission automatically changes the mechanical advantage in response to torque experienced by the driven shaft.

2. The outdoor power equipment of claim 1, wherein the transmission is a continuously variable transmission.

3. The outdoor power equipment of claim 2, wherein the transmission comprises:
   a first wheel coupled to the drive shaft; and
   a second wheel coupled to the driven shaft, wherein a working diameter of the second wheel changes as a function of torque acting on the driven shaft.

4. The outdoor power equipment of claim 3, wherein the transmission further comprises a belt coupling the first and second wheels, and wherein a working diameter of the first wheel changes as a function of tension in the belt.

5. The outdoor power equipment of claim 2, further comprising a governor that operates the throttle of the engine as a function of rotational speed of the driven shaft.

6. The outdoor power equipment of claim 5, wherein the governor is coupled to the driven shaft.

7. The outdoor power equipment of claim 1, wherein the tool comprises at least one of an auger, a blade, and tines.

8. Outdoor power equipment, comprising:
   an engine comprising a throttle and a drive shaft;
   a driven shaft;
   a tool coupled to the driven shaft;
   a continuously variable transmission coupling the drive and driven shafts and providing a mechanical advantage therebetween, wherein the transmission comprises:
      a first wheel coupled to the drive shaft;
      a second wheel coupled to the driven shaft; and
      a belt coupling the first and second wheels;
      wherein a working diameter of the second wheel changes as a function of torque acting on the driven shaft, thereby automatically changing the mechanical advantage in response to torque experienced by the driven shaft; and
      wherein a working diameter of the first wheel changes as a function of tension in the belt; and
   a governor that operates the throttle of the engine as a function of rotational speed of the driven shaft.

9. The outdoor power equipment of claim 8, wherein the governor is coupled to the driven shaft.

10. The outdoor power equipment of claim 9, wherein the engine does not include an additional governor.

11. An engine, comprising:
    an engine block;

a piston configured to translate in the engine block in response to combustion processes of the engine;

a crankshaft supported by the engine block and coupled to the piston;

an output shaft supported by the engine block and coupled to the crankshaft;

a transmission coupling the crankshaft and the output shaft and providing a mechanical advantage therebetween;

a governor; and a throttle, wherein the governor operates the throttle of the engine as a function of rotational speed of the output shaft;

wherein the crankshaft and the output shaft share a reservoir of lubricant.

12. The engine of claim 11, wherein the transmission changes the mechanical advantage in response to torque experienced by the output shaft.

13. The engine of claim 12, wherein the transmission is a continuously variable transmission and comprises:

a first wheel coupled to the crankshaft;

a second wheel coupled to the output shaft, wherein a working diameter of the second wheel changes as a function of torque in the output shaft; and a belt coupling the first and second wheels, wherein a working diameter of the first wheel changes a function of tension in the belt.

14. The engine of claim 13, wherein the second wheel has greater rotational inertia than the first wheel.

* * * * *